N. F. NIEDERLANDER.
AUTOMATIC TRAIN PIPE COUPLING.
APPLICATION FILED OCT. 29, 1906.
1,025,291.
Patented May 7, 1912.
2 SHEETS—SHEET 1.
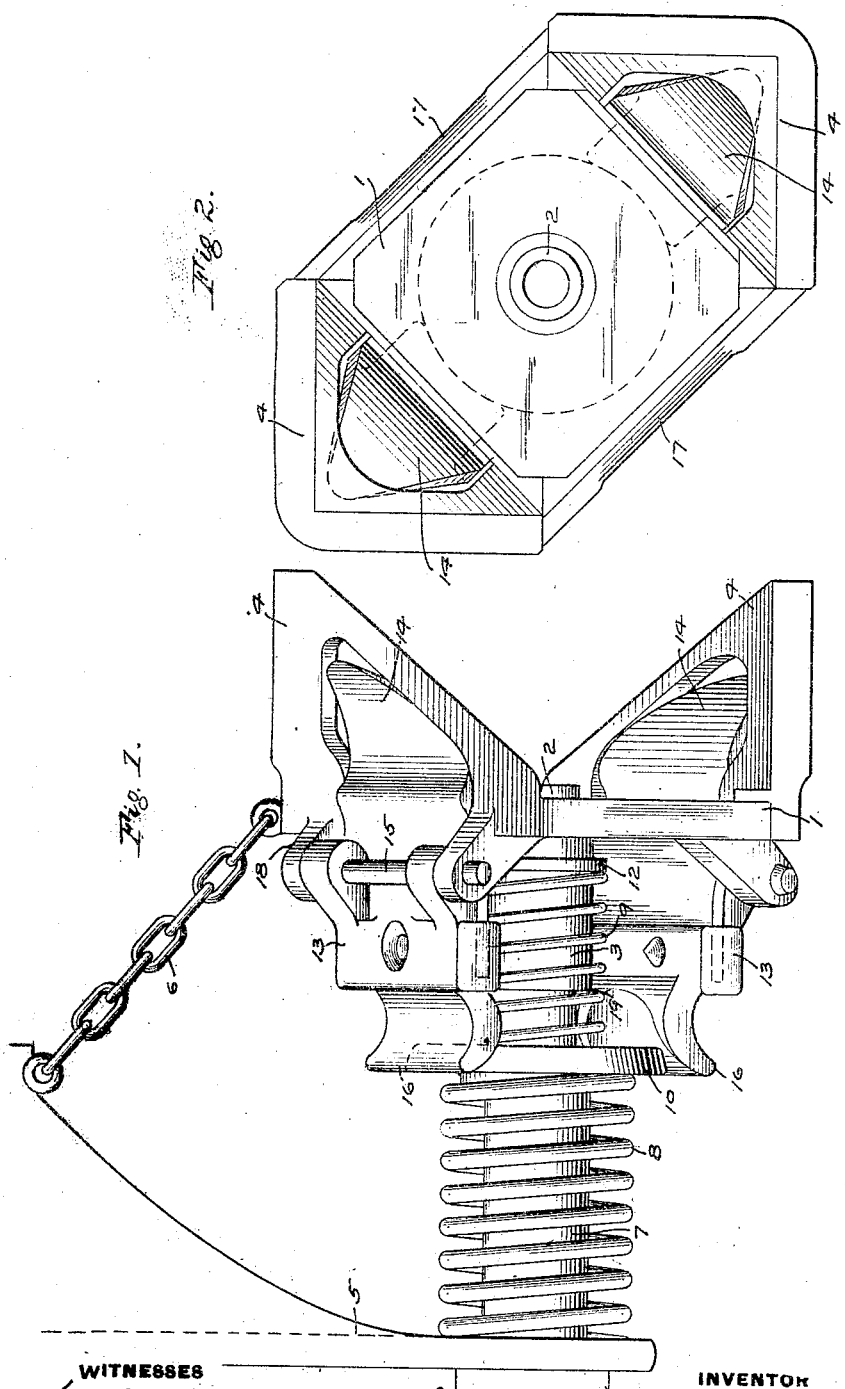

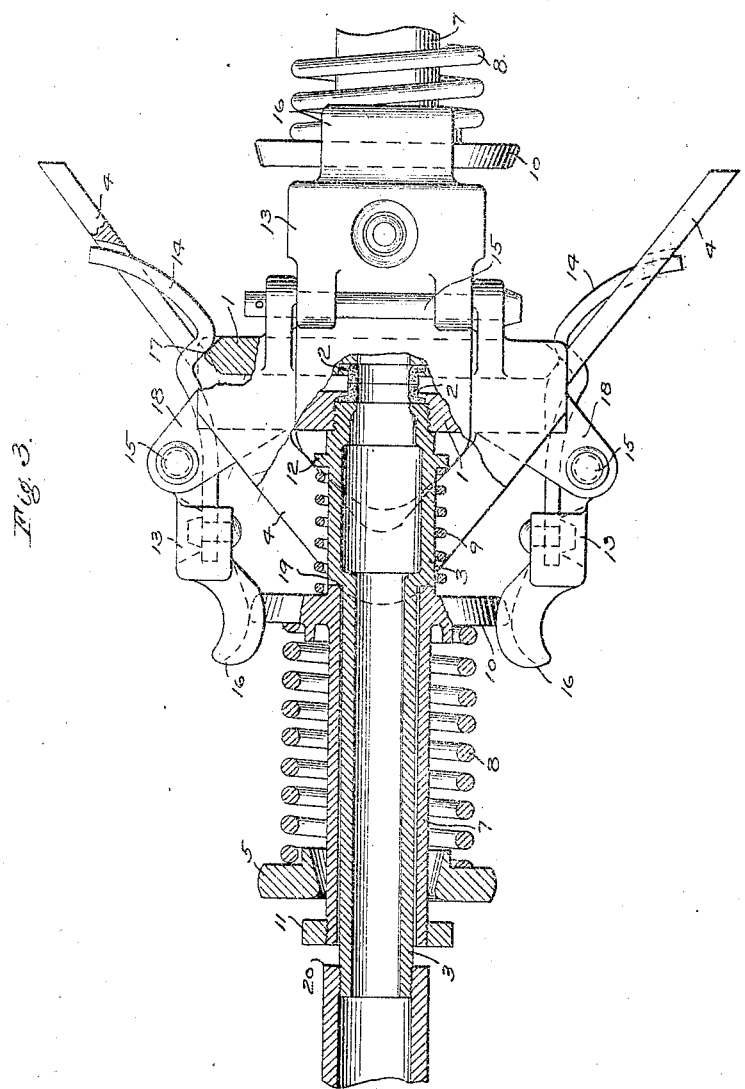

UNITED STATES PATENT OFFICE.

NICHOLAS F. NIEDERLANDER, OF ST. LOUIS, MISSOURI, ASSIGNOR TO WESTINGHOUSE AUTOMATIC AIR & STEAM COUPLER COMPANY, OF ST. LOUIS, MISSOURI, A CORPORATION OF ILLINOIS.

AUTOMATIC TRAIN-PIPE COUPLING.

1,025,291.      Specification of Letters Patent.      Patented May 7, 1912.

Application filed October 29, 1906. Serial No. 340,940.

*To all whom it may concern:*

Be it known that I, NICHOLAS F. NIEDERLANDER, a citizen of the United States, residing at St. Louis, in the State of Missouri, have invented new and useful Improvements in Automatic Train-Pipe Couplings, of which the following is a specification.

This invention relates to automatic couplings for air brake, signal, and other train pipes, for conducting fluid under pressure through a train of cars, and more particularly to that type having a butt joint with a straight port opening. In this class of automatic couplings the opposite or counterpart coupling heads of adjacent cars are usually held together merely by the force of springs which are compressed by the action of the cars in coming together and there is liability of leakage between the gaskets of the pipe couplings, due to lateral vibrations and the wear of the parts upon each other produced by irregular motion in passing around curves and various other causes.

The main object of my present invention is to provide improved means for clamping the coupling heads with their gaskets tightly together during the time that the parts are coupled up and thereby prevent a large amount of wear between the gaskets and preserve a fluid tight joint.

In the accompanying drawing; Figure 1 is a side elevation of an automatic coupling member embodying one form of my improvement; Fig. 2 an end view of the same, showing the coupling face; and Fig. 3 an elevation, taken at an angle of forty-five degrees, of two members coupled together, a part being broken away and shown in central longitudinal section.

According to the construction shown in the drawings, the coupling device comprises a head 1 having substantially a square face arranged perpendicular to the direction of movement of the cars and carrying a gasket 2 having an opening communicating with train pipe section 3 and adapted to make a butt joint with a corresponding gasket on a counterpart coupling head.

The sides of the square faced head are preferably arranged at an angle of forty-five degrees to vertical and horizontal planes, and two of the opposite sides are provided with outwardly flaring tapered wings or guide plates 4 for assisting in the gathering of the heads and guiding the same into the proper positions as the car couplings are brought together.

The pipe section 3 extends through a suitable hanger 5 attached to the car or to the car coupler and slides in a sleeve 7, which also passes through the hanger and is provided with a flange or plate 10 at its forward end and with a vent 11 at its inner end the main spring being mounted between the hanger and the plate 10. On the pipe section 3 a shoulder 19 is formed which engages the sleeve or plate 10 when the head is pushed inward to compress the preliminary spring 9.

For locking the heads together latch levers 13 are pivoted at 15 on brackets 18 formed on the heads 1 and having a spring latch 14 and a rearwardly curved end 16 for engaging the plate 10 when the preliminary spring 9 is compressed. This spring 9, which is much lighter than the main spring 8, is mounted on the pipe section 3 between the flanges 10 and 12, and normally acts to extend the coupling head to the position shown in Fig. 1 when the parts are uncoupled.

When the two counterpart heads of adjacent cars are brought together for coupling, the gathering flanges 4 guide the heads together in the proper position for the gaskets 2 to register with each other and further movement acts to compress the preliminary springs 9 until the shoulders 19 engage the end of the guide sleeve 7. During this movement the curved ends 16 of the levers 13 engage the plates 10 and turn the spring latches 14 to lock over the tapered edges 17 of the two opposing heads of the couplers and thereby clamp the same together, as shown in Fig. 3. During the further and final movement of the cars necessary to unite the car couplers the main springs 8 are compressed to a certain extent and the coupling operation is complete.

The heads may be suspended by means of chains 6, which provide for a sufficient flexibility to accommodate the lateral motion necessary in passing around curves and over other irregularities of the track.

During the running of the train with the cars coupled up, the gaskets 2 are held together not only with the pressure of the main springs 8 but with the spring latches of the locking levers by which the heads are clamped together, so as to prevent any leakage of fluid pressure between the gaskets even when the coupling heads are subjected to the severe jarring and lateral motion incident to the running of the train.

When the cars are uncoupled and move away from each other, the springs 8 first expand until the flange 11 engages the hanger 5, then the lighter springs 9 expand, still keeping the heads 1 together until the shoulder 20 of the pipe section 3 engages the flange 11 of guide sleeve 7. During this latter movement the head 1 with its pivoted locking lever moves away from the plate 10, so that the curved end 16 of the lever slides upon the plate and releases the spring latch 14, whereupon the heads 1 are free to separate as the car continues to move away.

Any suitable form of locking means operated by the movement of the coupling members in coming together may be employed for clamping the heads together, but I prefer to use the pivoted lever with a spring latch, as this construction has the additional advantage of permitting the heads to couple and uncouple by the yielding of the spring latch, even if for any reason the spring 9 should not have moved the ends 16 of the levers 13 away from engagement with the plates 10.

It will now be seen that by means of my improvement the air pipes or other fluid pressure conduits through a train may be automatically coupled and uncoupled at the time of coupling and uncoupling the cars.

While but one air pipe connection is shown in the drawing, it will be evident that two or more such couplings may be made at the same time and that the coupling heads may be readily formed to carry a corresponding number of gaskets communicating with the several pipe connections.

Having now described my invention, what I claim as new and desire to secure by Letters Patent, is:—

1. In an automatic pipe coupling, a coupling head carrying a gasket opening communicating with a pipe section, a main resistance spring for extending said head, means for clamping two counterpart heads together, and a preliminary spring for extending the head and releasing the clamping device.

2. In an automatic pipe coupling, a pipe section provided with a coupling head and a gasket opening, guide wings on said head, a spring for extending said head, locking levers operated by the lineal movement for clamping counterpart heads together, and a preliminary spring for extending the head to release the locking levers.

3. In an automatic pipe coupling, a pipe section provided with a coupling head and a gasket opening, guide wings on said head, a main spring for extending said head, locking levers for clamping counterpart heads together, a preliminary spring for further extending the head, and a cam plate for engaging the ends of the locking levers when the preliminary spring is compressed.

4. In an automatic pipe coupling, a pipe section provided with a coupling head and a gasket opening, guide wings on said head, a main spring for extending said head, locking levers for clamping counterpart heads together, a preliminary spring for further extending the head, a guide sleeve for carrying said pipe section, a hanger supporting the sleeve, and a cam plate carried on said sleeve for engaging the ends of the locking levers.

In testimony whereof I have hereunto set my hand.

NICHOLAS F. NIEDERLANDER.

Witnesses:
R. E. ADREON,
A. J. SENGOTTA.